(No Model.)
J. MÉLOTTE.
CENTRIFUGAL CREAMER.
No. 512,203. Patented Jan. 2, 1894.
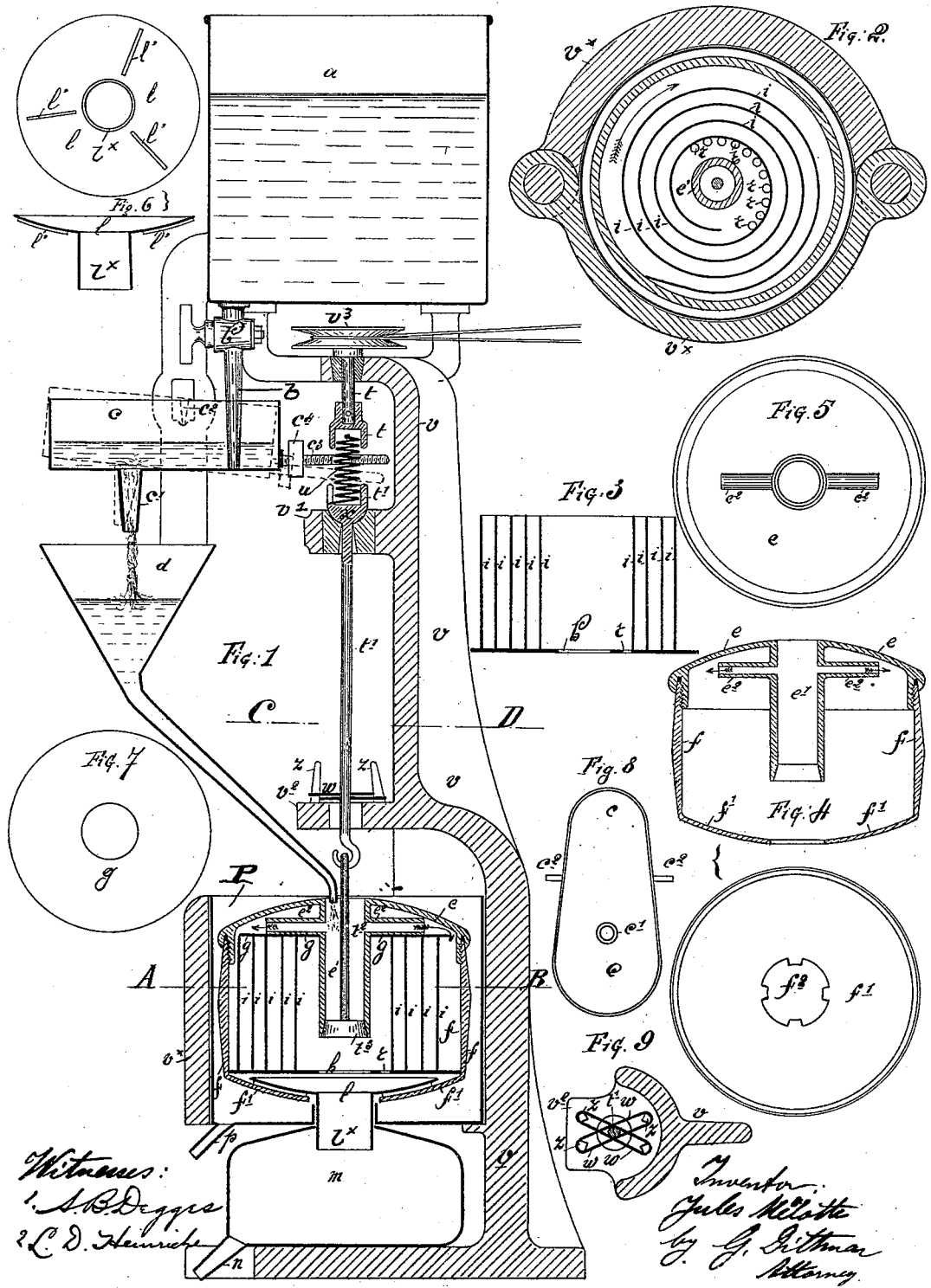

UNITED STATES PATENT OFFICE.

JULES MÉLOTTE, OF REMICOURT, BELGIUM, ASSIGNOR OF ONE-HALF TO JOHAN WILHELM REUTHER, OF HENNEF-ON-THE-SIEG, GERMANY.

CENTRIFUGAL CREAMER.

SPECIFICATION forming part of Letters Patent No. 512,203, dated January 2, 1894.

Application filed August 21, 1893. Serial No. 483,674. (No model.) Patented in Belgium June 23, 1888, No. 82,314; in Germany September 26, 1888, No. 52,294, and in France November 30, 1888, No. 194,443.

*To all whom it may concern:*

Be it known that I, JULES MÉLOTTE, a subject of the King of Belgium, residing at Remicourt, in the Kingdom of Belgium, have invented certain Improvements in Centrifugal Creamers, (for which patents have been granted in Germany September 26, 1888, No. 52,294; in France November 30, 1888, No. 194,443, and in Belgium June 23, 1888, No. 82,314,) of which the following is a specification.

This invention relates to certain improvements in cream separators and has for its object to provide an apparatus by which the cream may be separated from the blue milk in a more thorough and uniform manner and with a less expenditure of time and power than is possible with other devices heretofore employed for this purpose all as will be hereinafter fully set forth.

The novel features of my invention will be carefully defined in the claim.

In order that my improvement may be the better understood, I have illustrated in the accompanying drawings an apparatus embodying my invention, in which drawings—

Figure 1 is an axial section of a centrifugal creamer constructed according to my invention, and Fig. 2 is a horizontal section through the drum on the line A—B in Fig. 1. Figs. 3, 4, 5, 6, 7, 8 and 9 are detail views of the several parts of my apparatus which will be referred to hereinafter.

In these drawings $v$, represents a suitable metal frame at the base of which is formed a projecting annulus $v^x$ designed to surround and shield the drum of the separator.

Mounted on the top of the frame $v$ is a tank $a$ for holding the milk to be treated and immediately below this tank and aligned with the axis of the annulus $v^x$ are provided bearings $v'$, $v^2$ for the shaft employed for driving the drum. This shaft is formed in three sections an upper section $t$ collared in the frame $v$ and provided with a pulley $v^3$ whereby the shaft is driven, an intermediate section $t'$ having a ball or enlargement $x$ at its upper end which fits in a socket in the bearing $v'$ of the frame, said intermediate and upper sections being connected by a suitable spring $u$, whereby the drum is driven by a regular and uniform spring pressure and jarring and jolting is prevented, and a lower section $t^2$ coupled to the intermediate section by means of eyes or hooks formed at the ends of the respective sections. The drum $f$ has a screw-cover $e$, which is provided with a central depending open-ended tubular inlet $e$, the end of which is coned to fit a coned plug $t^3$ formed on the lower end of the lower section $t^2$ of the drum shaft whereby the drum is suspended. This inlet tube $e'$ is provided at opposite sides with radial discharge tubes $e^2$ near its upper end and milk is supplied thereto through a funnel $d$ the mouth of which is arranged under the outlet pipe $c'$ of a feed-regulator $c$ which I will now describe. The milk reservoir $a$ is provided with a valved outlet pipe $b$ the lower end of which is ground and opens into the tank or regulator $c$ which is hung on knife edges $c^2$ as clearly seen in Figs. 1 and 8. This tank $c$ is further provided at its rear end with a threaded stem $c^3$, carrying a nut $c^4$, whereby the weight of that end of the tank over the opposite or front end may be regulated at will. The pivots or knife edges $c^2$ are so arranged that when the tank is empty the rear end will fall and allow the milk to flow from tube $b$ thereinto until the weight has been counterbalanced by the milk in the tank when the tank will shift itself from the position seen in dotted lines to the position seen in full lines in Fig. 1.

In order to guide the lower end of the intermediate section $t'$ of the drum shaft I set about the opening in the bearing $v^2$ through which this shaft passes pins $z$ as seen in plan in Fig. 9, and over these pins and about the shaft I pass stout cords or bands $w$. This means will keep the shaft centered very accurately and at the same time admit of slight movement laterally as the upper end of the shaft rocks in the ball and socket joint.

The construction of the interior of the drum is as follows: The bottom of the drum is provided with a central opening as seen in Fig. 4, and in this opening are provided projecting ears $f^2$. A false bottom $l$ is arranged in the bottom of the drum and has a central depending open-ended tube $l^2$ which fits and is centered between the ears $f^2$ of the opening in the bottom of the drum and projects below the same as seen in Fig. 6. The under side of this false bottom is provided with radial flanges or ribs $l'$, whereby it is held slightly elevated above the bottom of the drum for purposes to be hereinafter explained. Arranged on this false bottom $l$ is a spiral separating chamber comprising a bottom $h$ and a spirally wound vertical wall $i$ mounted thereon, and in the bottom $h$ is provided a central aperture or opening and adjacent to the inner face of the wall $i$ is formed a spiral series of apertures $r$. The form and arrangement of these parts will be understood by inspection of Figs. 1, 2 and 3. The spiral chamber is covered by an annulus $g$, fitting closely about the tube $e'$, but of less diameter than the internal diameter of the drum, whereby the outer circumvolution of the spiral is open at its top.

Surrounding the drum and supported in the annulus $v^\times$ is a sheet metal blue milk receiver P having an outlet tube $p$, and provided with a central opening to receive the tubular extremity $l^\times$ of the false bottom, and beneath the drum is arranged a cream receiver $m$, having a central opening through which passes the said extremity $l^\times$ of the false bottom and said receiver is further provided with an outlet pipe $n$.

The operation is as follows: The milk being supplied to the drum through the funnel $d$, and passing out through the radial discharge tubes $e^2$ enters the outer circumvolution of the spiral separating chamber. By the revolution of the drum the full milk is gradually separated into two vertical and concentric layers of cream and blue milk which by reason of their inertia and under the action of the milk running into the drum gradually advance in the said separating chamber, coming finally to the center of the drum where the spiral ceases to exist. In the spiral the fatty matter separates from the blue milk which being heavier takes a position along the inner side of the sheet metal wall of the separating chamber, while the cream being lighter passes along the outside of the walls of the spiral. In the center of the drum the separation is complete and the cream passes out through the aperture $h$ in the bottom of the spiral, flows on the false bottom and into the receptacle $m$. The blue milk by reason of its higher density remains in the shape of a hollow column against the inner wall of the central circumvolution of the spiral and escapes through the openings $r$ and is immediately projected tangentially to the periphery of the drum whence it runs beneath the false bottom $l$ down into the receiver set to receive it as will be readily understood.

Having thus described my invention, I claim—

The combination with a frame, of a shaft journaled therein, said shaft comprising an upper section provided with a pulley, an intermediate section, a spring connecting said upper and intermediate sections, said intermediate section having a ball at its upper end and a hook at its lower end, the bearings $v'$ and $v^2$ for the opposite ends of said intermediate sections, one provided with a socket and the other with pins, cords rove about said pins, the lower section of said shaft having a hooked end coupled to the hooked lower end of the intermediate section, the drum provided with a screw cover having a central open-ended tube, the lower end of which is coned, the coned plug on the lower end of the lower section of the shaft, said plug engaging the coned end of said tube, the discharge tubes projecting radially from said central tube, the spiral separating chamber arranged in the drum and provided with a central opening and a spiral series of apertures $r$, the cover plate $g$ of less diameter than said spiral separating chamber, the false bottom provided with a central depending tube and having radial ribs on its lower face, said drum having in its bottom an opening provided with ears $f^2$, said tube on the false bottom engaging said opening in the drum, the annulus $v^\times$ surrounding the drum the blue milk receiver mounted in said annulus and having a central opening through which the tube on the false bottom passes, and the cream receiver $m$ having an opening to receive the lower end of said tube, substantially as set forth.

In witness whereof I have hereunto signed my name in the presence of two subscribing witnesses.

JULES MÉLOTTE.

Witnesses:
JULES HAMAL,
HORACE GREELEY.